United States Patent
Frauenfelder (10) Patent No.: US 12,109,978 B2
(45) Date of Patent: Oct. 8, 2024

(54) COVER FOR A STORAGE COMPARTMENT IN A MOTOR VEHICLE

(71) Applicant: Volkswagen Aktiengesellschaft, Wolfsburg (DE)

(72) Inventor: Rainer Frauenfelder, Harsum (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 567 days.

(21) Appl. No.: 17/324,841

(22) Filed: May 19, 2021

(65) Prior Publication Data
US 2021/0268966 A1   Sep. 2, 2021

Related U.S. Application Data (63) Continuation of application No. PCT/EP2019/079495, filed on Oct. 29, 2019.

(30) Foreign Application Priority Data

Nov. 20, 2018   (DE) ...................... 10 2018 219 849.7

(51) Int. Cl.
| | |
|---|---|
| *B60R 7/04* | (2006.01) |
| *B60R 11/02* | (2006.01) |
| *B60R 11/00* | (2006.01) |
| *H02J 50/10* | (2016.01) |

(52) U.S. Cl.
CPC ............ *B60R 7/04* (2013.01); *B60R 11/0241* (2013.01); *B60R 2011/0094* (2013.01); *H02J 50/10* (2016.02)

(58) Field of Classification Search
CPC .......................... B60R 7/04; B60R 2011/0094; B60R 11/0241
See application file for complete search history.

(56) References Cited

U.S. PATENT DOCUMENTS

| | | | | |
|---|---|---|---|---|
| 4,752,096 | A * | 6/1988 | Ishikawa ................ | B60H 1/243 296/37.16 |
| 5,588,480 | A * | 12/1996 | Armanno, Sr. .... | B60H 1/00271 165/41 |
| 5,951,085 | A | 9/1999 | Fukatsu | |
| 7,172,232 | B2 * | 2/2007 | Chiku ..................... | E05B 83/32 296/37.14 |
| 9,143,587 | B2 * | 9/2015 | Lachnitt ............. | H04M 1/0202 |

(Continued)

FOREIGN PATENT DOCUMENTS

| | | | |
|---|---|---|---|
| CN | 203198855 U | * | 9/2013 |
| CN | 104317088 A | | 1/2015 |

(Continued)

OTHER PUBLICATIONS

Machine Translation of CN203198855. (Year: 2024).*
Chinese Office Action dated Jan. 15, 2024 in corresponding application 201980076498.0.

*Primary Examiner* — Jason S Morrow
(74) *Attorney, Agent, or Firm* — Muncy, Geissler, Olds & Lowe, P.C.

(57) ABSTRACT

A cover for a storage compartment in a motor vehicle, having a top side and a bottom side, is characterized by ventilation slots or ventilation ducts which penetrate the cover, wherein at least some of the ventilation slots or ventilation ducts have slot walls or duct walls which form an angle α of 20° to 70° with the top side of the cover.

13 Claims, 8 Drawing Sheets

(56) References Cited

U.S. PATENT DOCUMENTS

| | | | |
|---|---|---|---|
| 9,516,914 B2 | 12/2016 | Dehn | |
| 10,173,599 B2* | 1/2019 | Gaw, Jr. | B60R 7/087 |
| 10,752,080 B1* | 8/2020 | Kroyer | F04D 25/166 |
| 10,833,526 B2 | 11/2020 | Thiel et al. | |
| 11,482,870 B2* | 10/2022 | Selby | H02J 50/10 |
| 11,485,291 B2* | 11/2022 | Leuenberger | B60R 7/04 |
| 11,654,832 B2* | 5/2023 | Minoyama | H02J 50/005 |
| | | | 296/24.34 |
| 2009/0152418 A1* | 6/2009 | Bury | B60R 11/0235 |
| | | | 248/205.3 |
| 2016/0327832 A1 | 11/2016 | Zhu et al. | |
| 2020/0324625 A1* | 10/2020 | Göthlin | B60H 1/3414 |
| 2021/0268966 A1* | 9/2021 | Frauenfelder | B60R 11/02 |
| 2021/0320528 A1* | 10/2021 | Kim | H02J 50/10 |
| 2021/0385967 A1* | 12/2021 | Hsiao | G06F 1/182 |

FOREIGN PATENT DOCUMENTS

| | | | | |
|---|---|---|---|---|
| CN | 105059197 A | * | 11/2015 | |
| CN | 204774981 U | | 11/2015 | |
| CN | 108321324 A | | 7/2018 | |
| DE | 10 2006 042 145 B3 | | 10/2007 | |
| DE | 10 2016 216 900 B3 | | 10/2017 | |
| DE | 102019215267 A1 | * | 4/2021 | |
| EP | 2 030 836 A1 | | 3/2009 | |
| JP | S6274018 U | * | 5/1987 | |
| JP | H 07-304394 A | | 11/1995 | |
| JP | 2003229150 A | * | 8/2003 | |
| KR | 19980017032 U | * | 7/1998 | |
| KR | 20180051059 A | * | 5/2018 | B60R 7/04 |
| WO | WO 2014/008423 A2 | | 1/2014 | |
| WO | WO-2019053777 A1 | * | 3/2019 | |

* cited by examiner

FIG. 1
State of the Art

COVER FOR A STORAGE COMPARTMENT IN A MOTOR VEHICLE

This nonprovisional application is a continuation of International Application No. PCT/EP2019/079495, which was filed on Oct. 29, 2019 and which claims priority to German Patent Application No. 10 2018 219 849.7, which was filed in Germany on Nov. 20, 2018 and which are both herein incorporated by reference.

BACKGROUND OF THE INVENTION

Field of the Invention

The present invention relates to a cover for a storage compartment in a motor vehicle, having a top side and a bottom side, a storage compartment having such a cover, and a motor vehicle having a corresponding storage compartment.

Description of the Background Art

The state of the art in motor vehicles includes a wide variety of storage compartments in order to give users access to items needed at any time during the journey or simply to provide storage space for items they have with them. For example, almost every vehicle manufactured today has cup holders, storage compartments for keys, sunglasses or other small items, and often also storage compartments or holders for cell phones, tablet PCs and the like. Many storage compartments are open, but lockable compartments are also known which can then be closed, for example, with a cover of the type described above.

As more and more cell phones are equipped with a wireless charging function, motor vehicles are now also being offered with storage compartments in which there is a device for wired or wireless charging of a cell phone or other electrical devices by means of a charging cable or by induction. When charging such an electrical device by cable and, in particular, by induction, losses necessarily occur during energy transfer and energy storage, which can result in heating of the electrical device to be charged, of the charging device and possibly also of the entire storage compartment. Attempts have therefore been made to cool in particular storage compartments with an inductive charging device. It is known from WO 2014/008423 A2 to cool an inductive charging device in various ways, for example convectively via an air flow. In this case, the heat is first transported from the immediate vicinity of the charging station to another unit, which then releases the heat into the environment in a controlled manner. Such an arrangement is technically complex and costly.

Further prior art is known from the publications JP H07-304394 A, DE 10 2016 216 900 B3 (which corresponds to U.S. Pat. No. 10,833,526) and DE 10 2006 042 145 B3 (which corresponds to U.S. Pat. No. 9,516,914).

Furthermore, many of the storage compartments known from the prior art have an open design, so that it cannot be ruled out that the driver becomes irritated during the journey by the cell phone placed in the storage compartment for charging, for example when incoming messages are shown on the display of the cell phone or other notifications or calls are shown on the display.

SUMMARY OF THE INVENTION

It is therefore an object of the present invention to provide a storage compartment and a cover for a storage compartment known from the prior art in such a way that the heat of an electronic device arranged in the storage compartment can be dissipated to a sufficient extent, while at the same time keeping the design effort low. Furthermore, possible distraction of the driver by the electronic device can be avoided or at least reduced.

The object is achieved in an exemplary embodiment by a generic cover with ventilation slots or ventilation ducts breaking through the cover, wherein at least part of the ventilation slots or ventilation ducts have slot walls or duct walls which form an angle of 20° to 70° with the top side of the cover.

In this context, a ventilation slot or ventilation duct is understood to mean, in particular, an element which breaks through the cover and through which gas exchange from one side of the cover to the other side of the cover is possible. In other words, the ventilation slot provides a fluid connection between the top side and the bottom side of the cover. Preferably, the top side of the cover and the bottom side of the cover run in parallel. In other words, the cover is a substantially flat body of constant thickness. An angle enclosed by two surfaces, for example an angle enclosed by slot walls or duct walls with the top side of the cover, is understood to be in particular the angle enclosed by the corresponding surface normals. If one of the surfaces has a more complex shape, in particular the surface normal can be used for a constructed correction plane.

In particular, the ventilation slots or ventilation ducts each can have two walls which form an angle of 20° to 70° with the top of the cover. The two walls preferably run parallel to one another. Accordingly, the ventilation slots or the ventilation ducts can be designed in such a way that they connect an opening in the top of the cover with an opening in the bottom of the cover, wherein the connection does not correspond to the shortest possible path through the cover, but instead runs obliquely through the cover. Accordingly, the opening in the top side and the opening in the bottom side do not lie congruently above one another, but instead are arranged offset from one another. Conventional ventilation slots or ventilation ducts, on the other hand, usually have side walls running exclusively perpendicular to the surface, i.e. to the top side or the bottom side of the cover.

In principle, the ventilation ducts can also be formed of bores, resulting in a round cross-section of the ventilation ducts. In this case, it is also possible to have a single side wall of the duct that is shaped like a cylinder jacket.

The ventilation ducts or ventilation slots thus have a closed circumference which is preferably constant over the length of the ventilation ducts or ventilation slots. The circumference can be round, in particular circular, or polygonal, in particular quadrangular.

According to the invention, a cover can be understood to mean, for example, an element which closes the storage compartment, for example a lid or a flap. The cover is preferably arranged in such a way that it closes a storage compartment arranged under or behind the cover. The storage compartment can then be used by a user to store objects after the cover has been opened or removed.

The cover according to the invention can be used particularly advantageously in connection with a storage compartment located in the field of view of a user, in particular the driver of the motor vehicle. The storage compartment may, for example, be arranged in the center console of a motor vehicle. The storage compartment is then preferably configured or suitable for accommodating an electronic device, in particular an electronic device comprising a display, for example a cell phone, smartphone, tablet PC or the like. The cover then prevents the electronic device from being visible to the user and possibly distracting him while driving. When installed, the cover is preferably oriented horizontally or at an angle of less than 45° to the horizontal, preferably at an angle of less than 30° to the horizontal.

In this way, a largely unhindered exchange of air between the interior of the storage compartment and the surroundings is possible. Warm air can flow outwards from the interior of the storage compartment through the ventilation slots or ventilation ducts, effectively cooling the interior of the storage compartment and thus any electrical device located there.

At the same time, the cover of the storage compartment according to the invention prevents, at least to a large extent, the driver of the vehicle from being disturbed or irritated by the display of an electrical device stored in the storage compartment. As a rule, in particular in the case of a storage compartment according to the invention arranged in the region of the center console, the driver looks at the storage compartment and thus at the cover, which normally closes off the storage compartment at the top, from a steep angle of view approximately from above. If the cover were now provided with ventilation slots or ventilation ducts whose side walls, as is customary, form a right angle with the top side and/or bottom side of the cover, the contents of the storage compartment would basically be visible when looking directly at the storage compartment from above, but also when viewed from a sufficiently steep angle. The fact that the side walls of the ventilation slots and/or ventilation ducts, which can also be referred to as slot walls or duct walls, form the aforementioned angle of 20° to 70°, preferably 25° to 55°, with the top side of the cover, reduces the viewing angle at which the contents of the storage compartment could theoretically be visible so that the contents of the storage compartment are not visible when the driver is in his usual position.

In other words, the cover is designed in such a way that a central axis of the ventilation slots or ventilation ducts differs so clearly from a typical viewing angle at which a driver views the storage compartment while driving that the contents of the storage compartment are not visible to the driver while driving. For this purpose, an angle between the typical viewing direction or the typical viewing angle and the central axis of the ventilation slots or ventilation ducts should be at least 30°, preferably at least 45° and particularly preferably at least 60°.

A ventilation slot can be understood to be, for example, an elongated recess through the full thickness of the cover. The recess typically has a prismatic shape with parallel side walls. In particular, a ventilation duct is also understood to be a recess that penetrates the full thickness of the cover. In contrast to a ventilation slot, a ventilation duct has a more compact cross-section, which can be square, oval, elliptical or circular, for example. The central axis of the ventilation slot or ventilation duct is understood to be the direction of the shortest connection between the top side and bottom side of the cover, which runs parallel to one of the side walls, particularly in the case of parallel side walls. If the side walls are not parallel to one another or are not flat, a correction plane or best-fit line through the side wall can be used. For example, a ventilation slot can have a length between 1 cm and 5 cm and a width between 1 mm and 5 mm. In this context, an angle enclosed by the slot walls or the duct walls with the top side of the cover is understood to be in particular the angle between a straight line lying on the corresponding wall and connecting the top side of the cover with the bottom side of the cover by the shortest route, and the projection of this straight line onto the top side of the cover.

A projection of at least one central axis of the ventilation slots and/or the ventilation ducts onto the top side of the cover, when the cover is installed in a motor vehicle, can form an angle of 70° to 110° with a conventional direction of travel of the motor vehicle. In particular, reference is made to a position of the cover in which it closes the storage compartment. In a particularly preferred embodiment, the ventilation slots extend perpendicular to the conventional direction of travel of the vehicle, namely the so-called forward direction of travel of the vehicle. The ventilation slots and/or the ventilation ducts can be designed in such a way that some of the ventilation slot and/or the ventilation duct penetrating the top side of the cover is offset forward in relation to some of the ventilation slot and/or the ventilation duct penetrating the bottom side of the cover, as seen in the conventional direction of travel.

According to a further development of the invention, an air-permeable film and/or an air-permeable membrane is arranged on the bottom side and/or on the top side of the cover, which covers at least some of the ventilation slots and/or the ventilation ducts. Such a film and/or such a membrane may also be referred to as breathable. The film or membrane protects the interior of the storage compartment from external influences such as dust or the like. The film or membrane can preferably cover all existing ventilation slots and/or all existing ventilation ducts.

The film and/or the membrane can be impermeable to water. This prevents water from penetrating into the storage compartment. This is particularly important if an electrical device, such as a cell phone, is stored in the storage compartment, which could otherwise be damaged if moisture or a liquid penetrates. This could be the case if, for example, a drink was placed in a cup holder often also located in the center console area.

In order to achieve efficient ventilation of the interior of the storage compartment, it is expedient for the cover to have at least 3 ventilation slots or ventilation ducts, preferably at least 5 ventilation slots or ventilation ducts. A larger number of ventilation slots and/or ventilation ducts, for example at least 10 or at least 20 ventilation slots and/or ventilation ducts, is of course also conceivable. A simple and thus visually appealing appearance results if all ventilation slots and/or all ventilation ducts are identical in size, orientation and shape. Different shapes of ventilation slots or ventilation ducts as well as a combination of ventilation slots and ventilation ducts are of course also conceivable. For example, the length of a single ventilation slot can make up a large proportion, e.g. at least 50%, at least 60%, at least 70% or at least 80%, of the extent of the cover in a longitudinal direction or in a transverse direction of the cover. In that case, a plurality of ventilation slots extending completely through the thickness of the cover may be arranged parallel to each other in the cover. To increase the stability of the cover, it is also possible to make the ventilation slots shorter rather than very long, as described above. For example, the length of each individual ventilation slot may be less than 40% or less than 20% of the extent of the cover in a longitudinal direction or in a transverse direction of the cover. Then, instead of one long ventilation slot, several shorter ventilation slots can be arranged one after the other, so that a two-dimensional matrix of ventilation slots results with a plan view of the cover. The same is of course possible for the ventilation ducts.

The efficiency of the ventilation of the interior of the storage compartment increases if the total cross-section of the ventilation slots or the ventilation ducts is increased. According to a preferred embodiment of the invention, therefore, a proportion which accounts for a surface area of the ventilation slots or the ventilation ducts on a surface area of the bottom side of the cover constitutes at least 5%, preferably at least 10%.

If the cover is fitted with a hinge or otherwise pivotable, a practical and visually pleasing design can be achieved if the ventilation slots or ventilation ducts extend parallel to a pivot axis about which the cover can be pivoted.

The object according to the invention is further achieved by a storage compartment having a cover according to the invention. The object is also achieved by a motor vehicle with a storage compartment having a cover according to the invention. Such a storage compartment preferably includes a charging device, in particular preferably an inductive charging device, for electronic devices. Such an inductive charging device is sufficiently known from the prior art and is therefore not described in detail here. The storage compartment is preferably suitable for accommodating a mobile electronic device. The cover is then preferably configured to assume a first position in which the storage compartment is open and a second position in which the storage compartment is closed. In the second position, the cover separates the interior of the storage compartment from the surroundings, in particular from the vehicle interior. It is thus possible for an object, for example an electronic device, to be placed in the storage compartment and separated from the surroundings by the cover. However, due to the ventilation slots or ventilation ducts, air exchange and thus temperature control of the contents of the storage compartment is still possible. Overheating of the contents of the storage compartment is thus reliably avoided. In a preferred embodiment, the storage compartment is designed in such a way that the cover is not in direct contact with the contents of the storage compartment when the storage compartment is in use. In particular, no object then rests on the cover. The cover preferably closes a top side of the storage compartment and is then correspondingly aligned essentially horizontally when the storage compartment is closed.

The cover can be attached to the storage compartment by means of a joint or a hinge. It can then be designed to pivot about a pivot axis so that the cover can close the storage compartment in a manner similar to a hinged lid.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
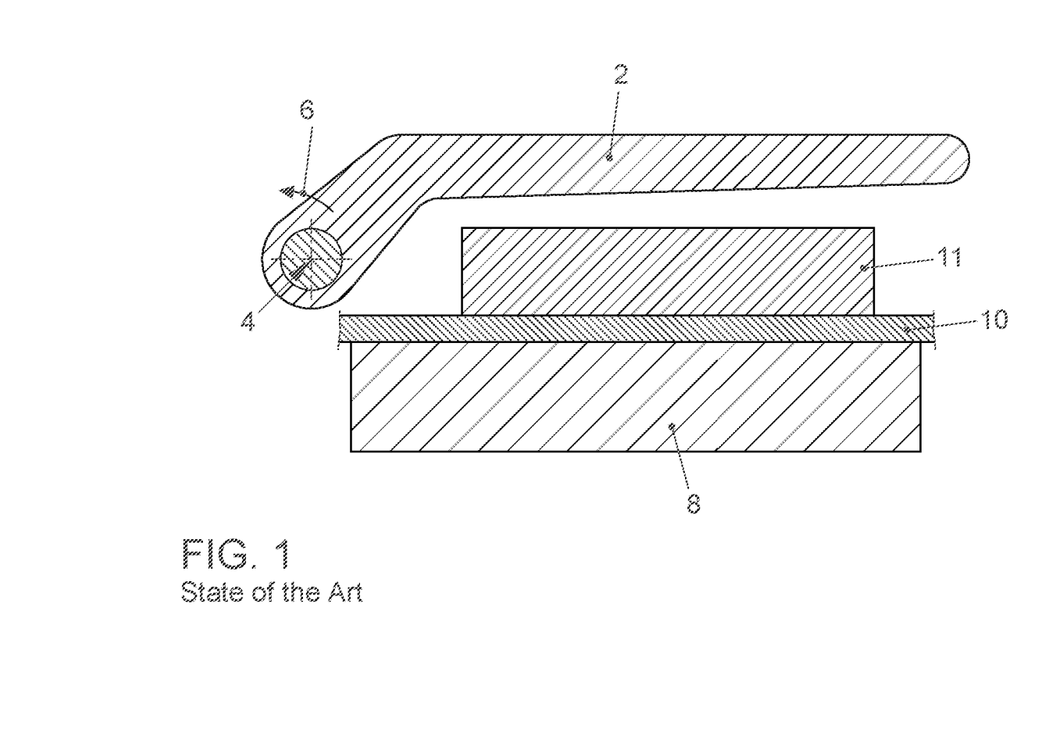
FIG. 1 shows a storage compartment with a cover according to the state of the art.

FIG. 1 shows a cross-section through a cover 2 as known from the prior art. The cover 2 is designed as a lid-like flap which can be pivoted about a pivot axis by means of a joint 4, which pivoting is symbolized by the arrow 6. The actual storage compartment is not shown for the sake of clarity. However, a wireless inductive charging element 8 is arranged in the storage compartment, which is not shown, as a charging device. The charging element 8 is covered by a rubber mat 10. The cell phone 11, which can be charged by the charging element 8, lies on this rubber mat 10. All of the elements shown in FIG. 1 can also be combined with a cover according to the invention.

Figure 2:
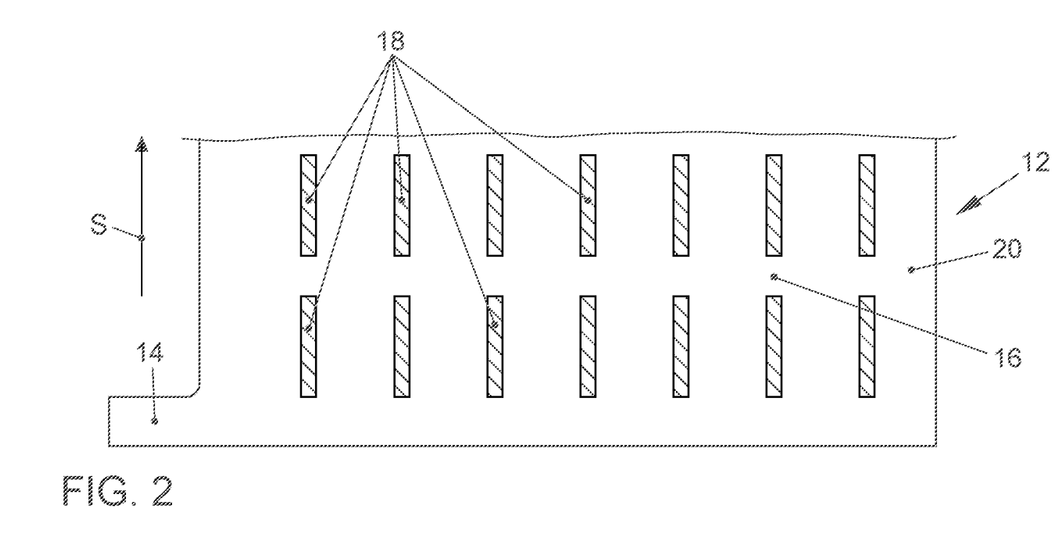
FIG. 2 shows an exemplary embodiment of a cover according to the invention in a plan view.

FIG. 2 shows a plan view of a section of a cover 12 according to the invention. The cover 12 is designed as a flat flap. It has a hinge area 14 by means of which the cover 12 can be pivoted about a pivot axis S. In the cover area 16, the cover 12 has a plurality of slots 18 which penetrate the cover 12. Since the openings of the slots 18 in the top side 20 of the cover 12 are not congruently arranged above the openings of the slots 18 in the bottom side of the cover 12, an observer cannot see through the slots 18 into the interior of the storage compartment, which is not shown, from the angle shown. The slots 18 are configured in a two-dimensional pattern so that they are arranged side by side and one behind the other. In the illustrated exemplary embodiment, the slots have a length of 1 to 2 cm and a width of a few mm.

Figure 3:
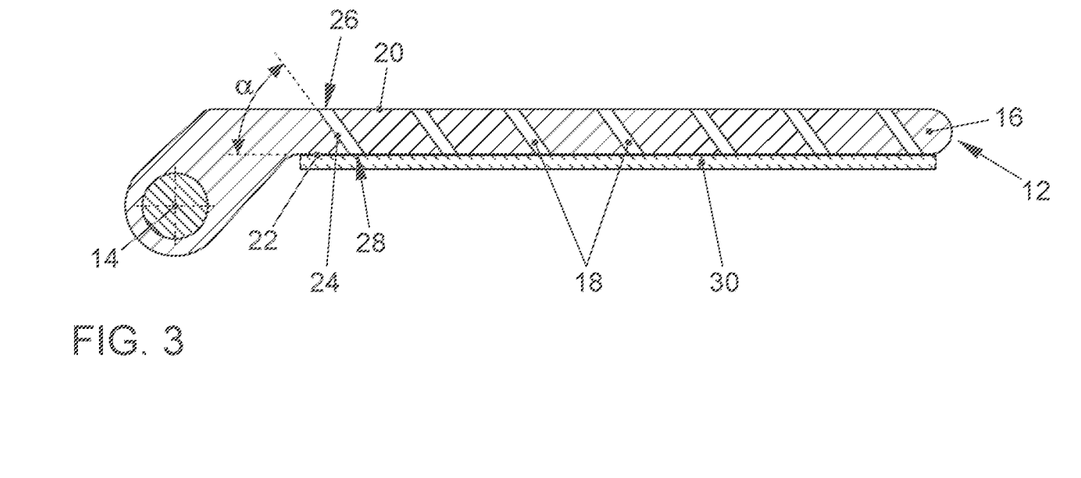
FIG. 3 shows the exemplary embodiment in cross-section.

FIG. 3 shows a cross-section of the exemplary embodiment from FIG. 2. The cover 12 with the hinge area 14 and the cover area 16 as well as the slots are visible.

The top side 20 of the cover 12 is connected to the bottom side 22 of the cover 12 by the slots 18, so that air from the vehicle interior above the cover 12 can flow into the storage compartment underneath the cover 12, and vice versa. The side walls 24 of the slots 18 form an angle α with the bottom side 22 of the cover 12. Since the bottom side 22 and the top side 20 are parallel to each other, the same angle α is also formed by the side walls 24 of the slots 18 with the top side 20. The mentioned angle α causes the top openings 26 of the slots 18 and the bottom openings 28 of the slots 18 not to be congruent on top of each other, but instead offset to each other. An observer looking directly at the cover 12 from above thus does not see the contents of the storage compartment behind the top openings 26 of the slots 18, but only the side walls 24 of the slots 18. He can thus also not be irritated by the display of a cell phone placed in the storage compartment.

A membrane 30 is attached to the bottom side 22 of the cover 12 in the area of the cover area 16 to seal the cover 12 against liquids. It is designed to be air-permeable so that the cooling function of the cover 12 is not impaired. Suitable membranes with corresponding properties are known, for example, from the textile sector.

Figure 4:
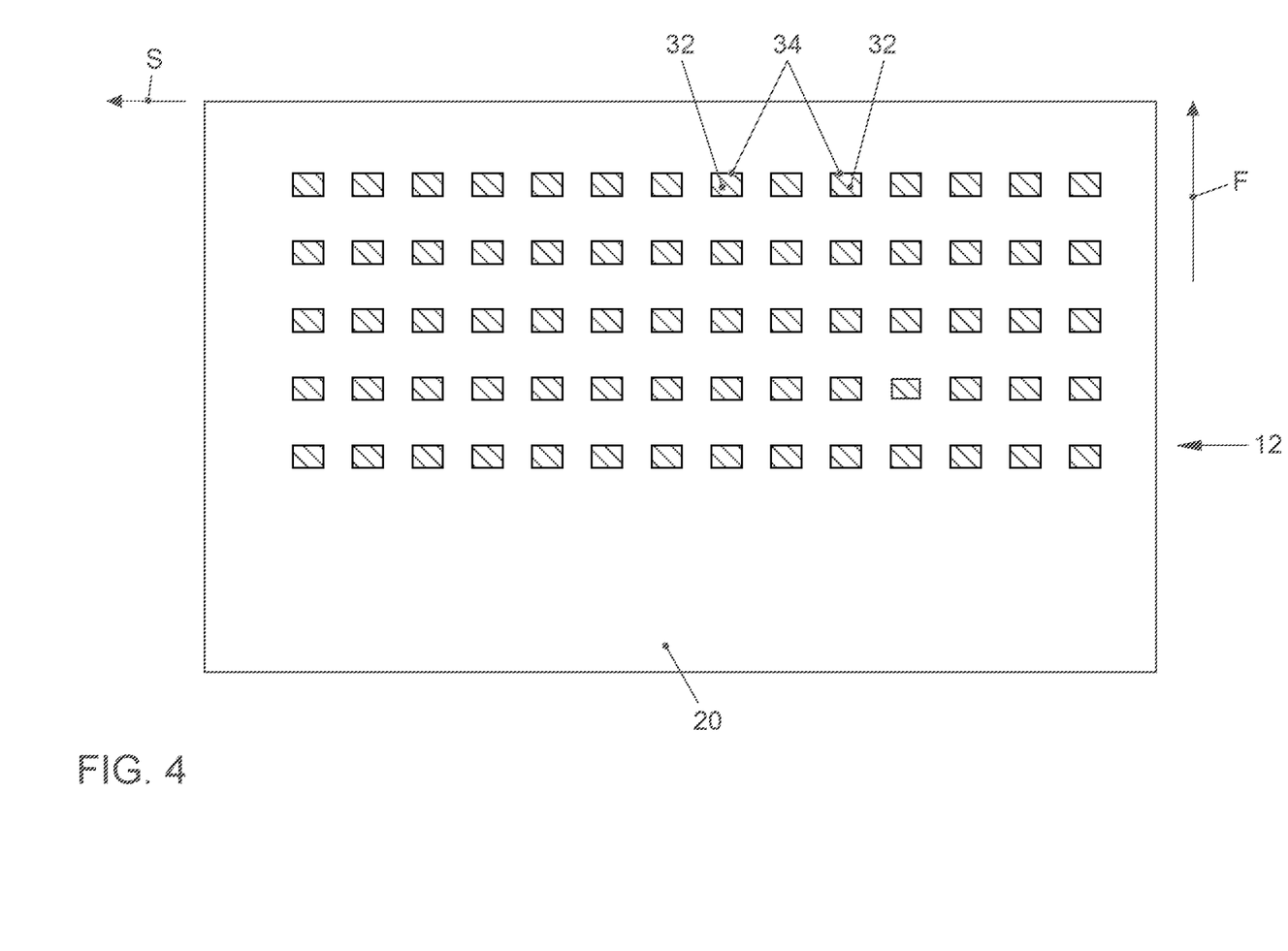
FIG. 4 shows an exemplary embodiment of a cover according to the invention in a plan view.

FIG. 4 shows a second exemplary embodiment of a cover 12 according to the invention in a schematic plan view. The cover 12 is designed to be pivotable about the pivot axis S. The top side 20 of the cover 12 is penetrated by the top openings 34 of the ventilation ducts 32. The ventilation ducts 32 are distributed in a uniform pattern across the cover 12. Accordingly, the top openings 34 of the ventilation ducts 32 are also distributed uniformly over the top side 20 of the cover 12. The top openings 34 have a rectangular, almost square cross-section.

Figure 5:
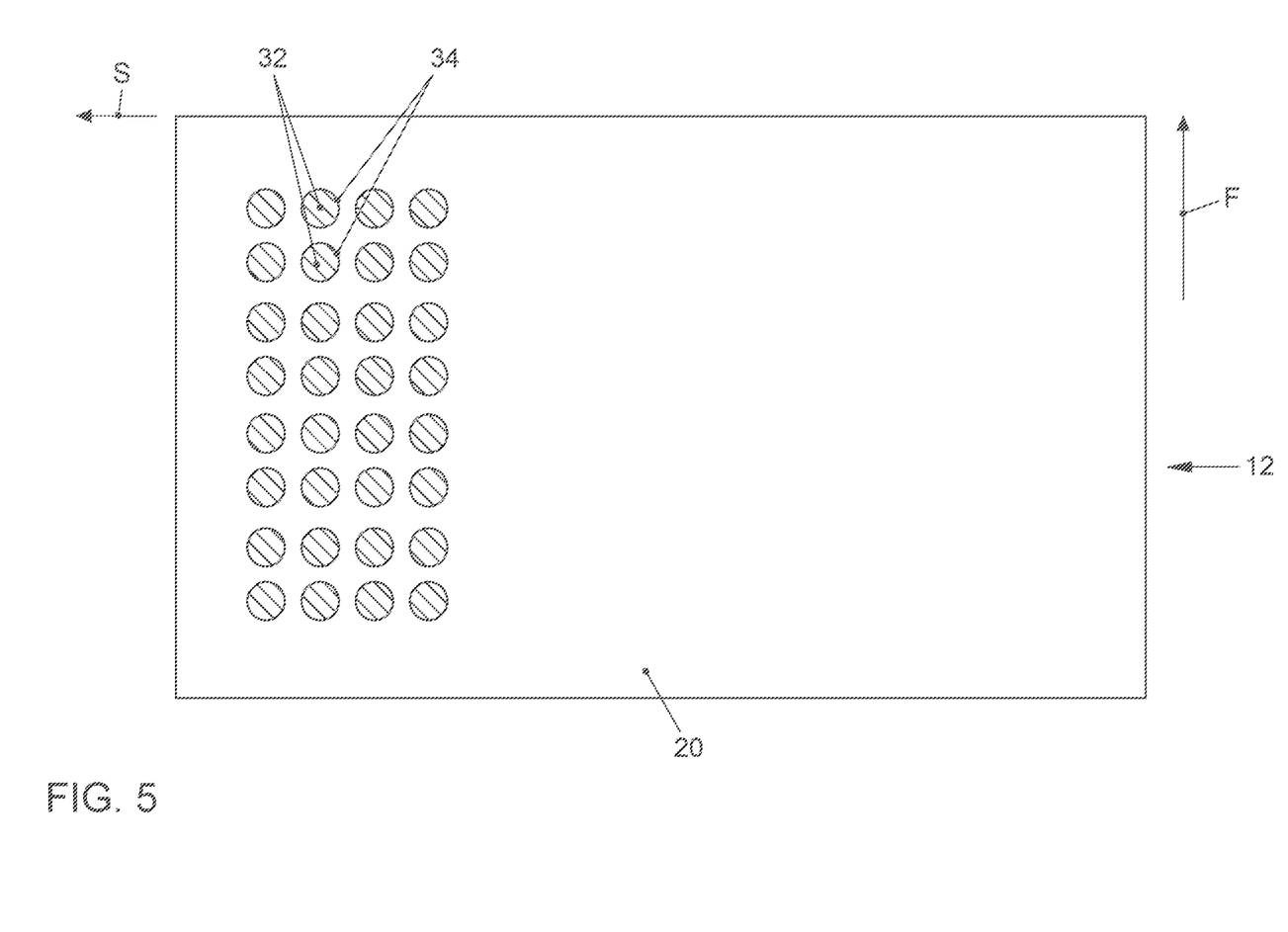
FIG. 5 shows an exemplary embodiment of a cover according to the invention in a plan view.

FIG. 5 shows a third exemplary embodiment of a cover 12 according to the invention in a schematic plan view. Ventilation ducts 32 are also present in this embodiment. In this case, however, the top openings 34 have a circular cross-section. The ventilation ducts 32 are only present in the area on the left in the figure. Such a layout of the cover 12 can be used, for example, if it is known that below a certain area of the cover 12, i.e. in this case in the left-hand area in the figure, increased heat development is to be expected, so that particularly efficient ventilation is necessary here.

Figure 6:
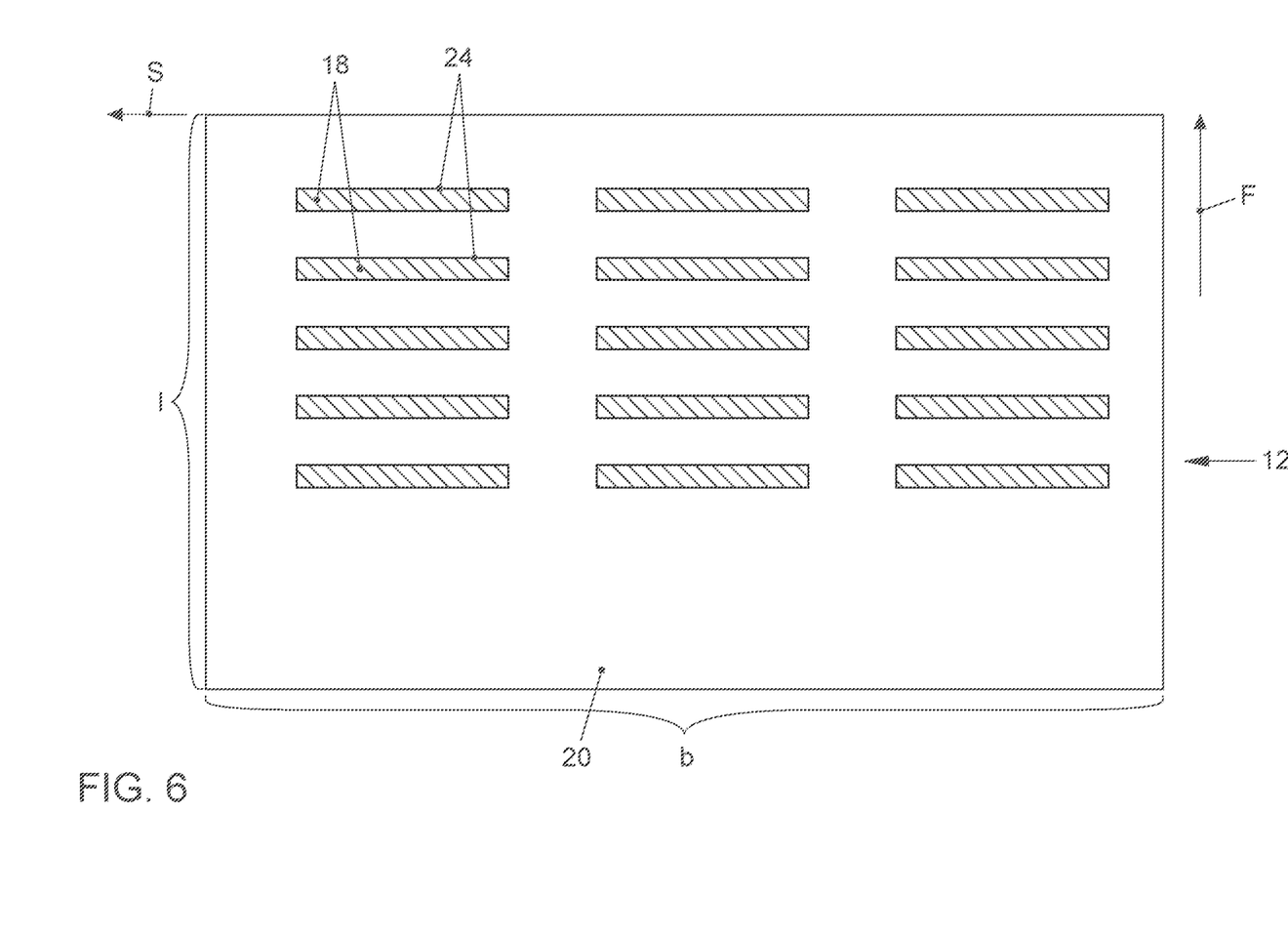
FIG. 6 shows an exemplary embodiment of a cover according to the invention in a plan view.

FIG. 6 shows a fourth exemplary embodiment of a cover 12 according to the invention in a schematic plan view. The illustrated exemplary embodiment has a total of 15 ventilation slots 18 which extend almost over the entire width b of the cover 12. In each case three slots 18 are arranged one behind the other, wherein the length of each slot 18 amounts to about one quarter of the total extent of the cover 12 in the direction of the width b. In the direction of the length l of the cover 12, in each case five slots 18 are arranged one above the other, resulting in a uniform 3×5 matrix of slots 18.

Figure 7:
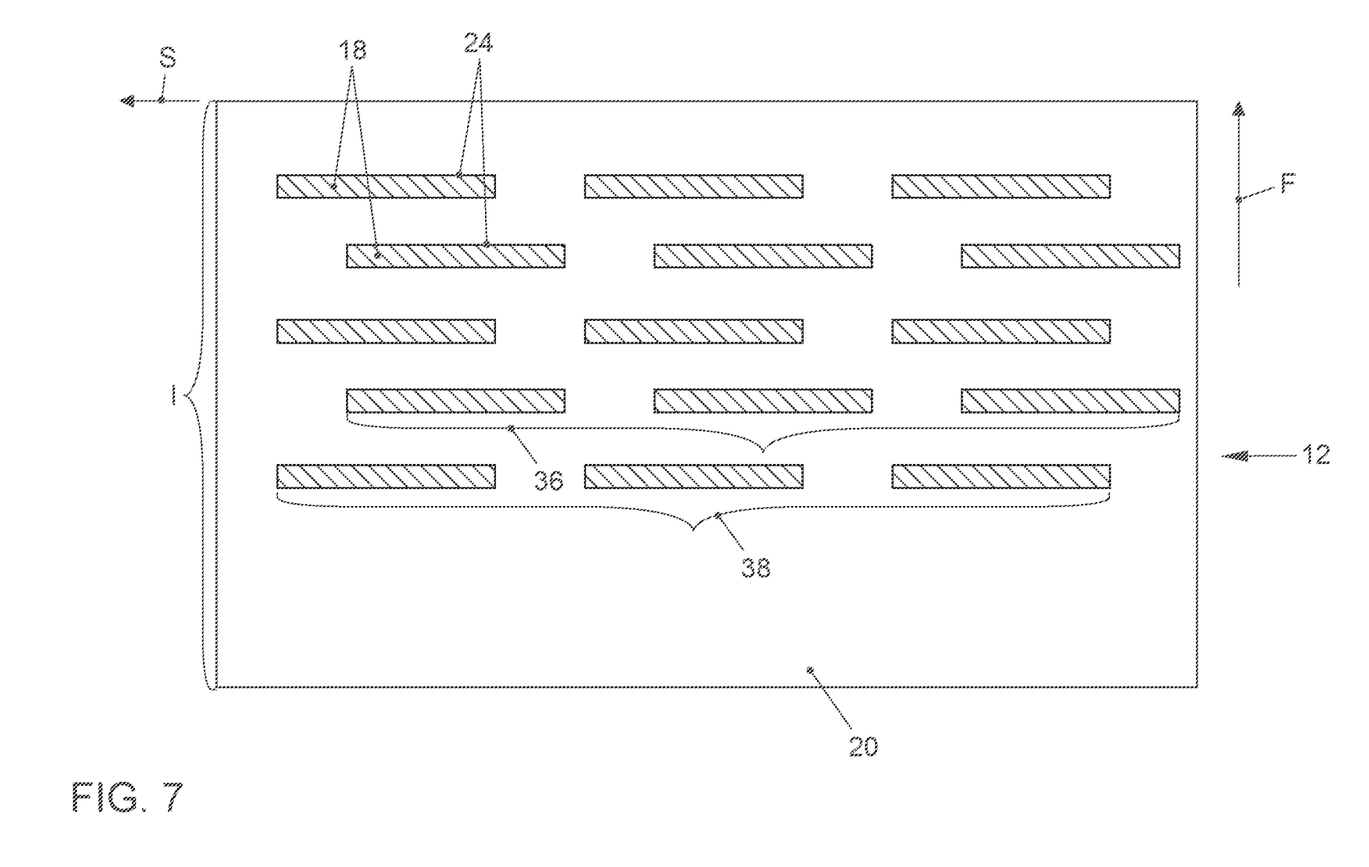
FIG. 7 shows an exemplary embodiment of a cover according to the invention in a plan view.

FIG. 7 shows a fifth exemplary embodiment of a cover 12 according to the invention in a schematic plan view. This embodiment is very similar to that shown in FIG. 6, but differs in the arrangement of the slots 18. The slots 18 can be grouped into rows 36, 38, respectively, with the slots in rows 36 being longitudinally offset from the slots in rows 38. Such an arrangement may have advantages for efficient ventilation and or for stability of the cover 12.

Figure 8:
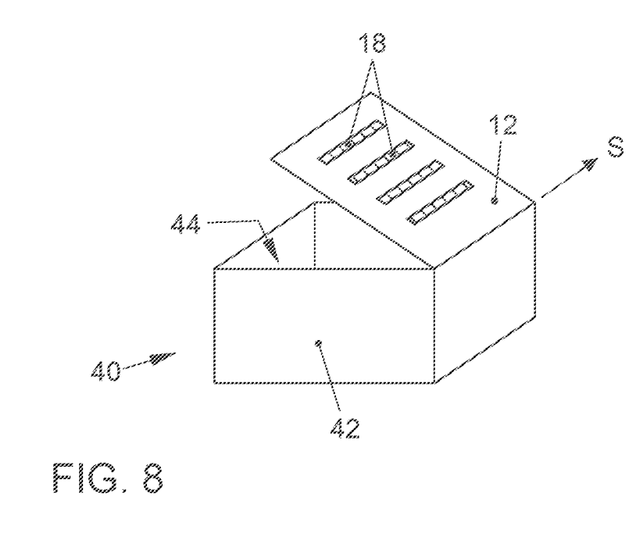
FIG. 8 shows an exemplary embodiment of a storage compartment according to the invention.

FIG. 8 shows a schematic view of a storage compartment 40 according to the invention. The storage compartment 40 has side walls 42 which enclose an interior space 44. The storage compartment 40 can be closed at the top by means of a cover 12 which can be pivoted about a pivot axis S. The cover 12 has ventilation slots 18 which allow for sufficient ventilation of the interior space 44 even when the cover 12 is closed.

Figure 9:
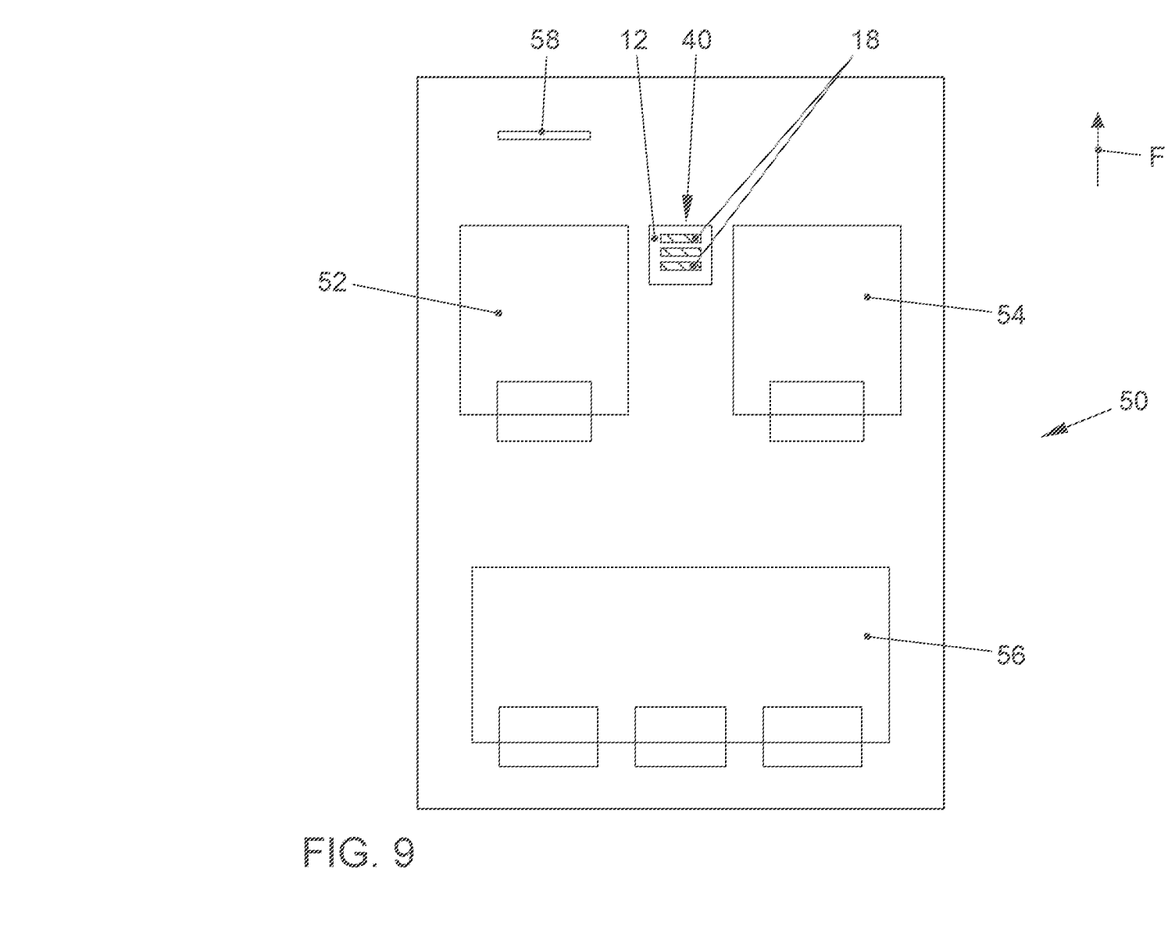
FIG. 9 shows an exemplary embodiment of a motor vehicle according to the invention.

FIG. 9 shows a schematic view of a motor vehicle 50 according to the invention in a plan view. The driver's seat 52, the passenger seat 54, the back seat 56 and the steering wheel 58 are shown. The storage compartment 40 with the slots 18 arranged in the cover 12 is shown between the driver's seat 52 and the passenger seat 54.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cover for a storage compartment in a motor vehicle, the cover comprising:
    a top side;
    a bottom side; and
    ventilation slots or ventilation ducts that are vertically elongated through the full thickness of the cover, the ventilation slots or ventilation ducts having a top opening and a bottom opening,
    wherein at least one of the ventilation slots or ventilation ducts have slot walls or duct walls which form an angle α of 20° to 70° with the top side of the cover, and
    wherein the top opening is offset from the bottom opening.

2. The cover according to claim 1, wherein a projection of at least one central axis of some of the ventilation slots and/or the ventilation ducts onto the top side of the cover when the cover is installed in a motor vehicle forms an angle of 70° to 110° with a conventional driving direction of the motor vehicle.

3. The cover according to claim 1, wherein an air-permeable film and/or an air-permeable membrane is arranged on the bottom side and/or on the top side of the cover, which membrane covers at least some of the ventilation slots and/or the ventilation ducts.

4. The cover according to claim 3, wherein the film and/or the membrane is impermeable to water.

5. The cover according to claim 1, wherein the cover has at least 3 ventilation slots or ventilation ducts, or at least 5 ventilation slots or ventilation ducts.

6. The cover according to claim 1, wherein a proportion which accounts for a surface of the ventilation slots or the ventilation ducts on a surface area of the bottom side of the cover is at least 5%, or at least 10%.

7. The cover according to claim 1, wherein the ventilation slots or the ventilation ducts, when the cover is installed in a motor vehicle, extend parallel to a pivot axis S about which the cover is pivotally arranged.

8. A storage compartment for a motor vehicle having a cover according to claim 1.

9. The storage compartment according to claim 8, further comprising an inductive charging device for electronic devices.

10. A motor vehicle comprising a storage compartment and/or having a cover according to claim 1.

11. The cover according to claim 1, wherein the ventilation ducts comprise bores.

12. The cover according to claim 1, wherein at least one of the slot walls or duct walls have a cylinder jacket shape.

13. The cover according to claim 1, wherein the cover is a storage compartment lid.

* * * * *